United States Patent
Tanaka

(10) Patent No.: US 10,775,243 B2
(45) Date of Patent: Sep. 15, 2020

(54) VISIBLE LIGHT ABSORPTION ELEMENT, AND TEMPERATURE VISUALIZATION DEVICE AND INFRARED RAY VISUALIZATION DEVICE EQUIPPED WITH SAME

(71) Applicant: RIKEN, Saitama (JP)

(72) Inventor: Takuo Tanaka, Saitama (JP)

(73) Assignee: RIKEN, Saitama (JP)

( * ) Notice: Subject to any disclaimer, the term of this patent is extended or adjusted under 35 U.S.C. 154(b) by 557 days.

(21) Appl. No.: 15/677,428

(22) Filed: Aug. 15, 2017

(65) Prior Publication Data

US 2017/0370777 A1    Dec. 28, 2017

Related U.S. Application Data

(63) Continuation of application No. PCT/JP2016/053898, filed on Feb. 10, 2016.

(30) Foreign Application Priority Data

Feb. 20, 2015    (JP) .................................. 2015-031497

(51) Int. Cl.
*G01J 5/08*        (2006.01)
*G01J 1/38*        (2006.01)
(Continued)

(52) U.S. Cl.
CPC ............... *G01J 5/0853* (2013.01); *G01J 1/02* (2013.01); *G01J 1/38* (2013.01); *G01J 1/4228* (2013.01);
(Continued)

(58) Field of Classification Search
CPC .... G01J 5/0853; G01J 1/02; G01J 1/38; G01J 1/4228; G01J 5/023; G01J 5/38; G01J 5/44; G01J 5/48; G02B 5/208; G02B 5/22
See application file for complete search history.

(56) References Cited

U.S. PATENT DOCUMENTS

| | | | | |
|---|---|---|---|---|
| 4,959,546 A | * | 9/1990 | Bly | ............................ G01D 5/40 250/330 |
| 8,803,637 B1 | * | 8/2014 | Peralta | .................... H01P 7/082 333/204 |

(Continued)

FOREIGN PATENT DOCUMENTS

| JP | 2001-141557 A | 5/2001 |
|---|---|---|
| JP | 2008-065030 A | 3/2008 |

(Continued)

OTHER PUBLICATIONS

Kentaro Miyoshi et al., "Facile Fabrication of Silver Nanofin Array via Electroless Plating", pp. 4205-4208, American Chemical Society, Published on Web Mar. 1, 2008.

(Continued)

*Primary Examiner* — Georgia Y Epps
*Assistant Examiner* — Don J Williams
(74) *Attorney, Agent, or Firm* — Merchant & Gould, P.C.

(57) ABSTRACT

In accordance with heat received from a target object, a visible light absorption element 10 changes a frequency component of visible light to reflect or transmit. The visible light absorption element 10 possesses a resonance frequency included in a visible light frequency region. The visible light absorption element 10 absorbs visible light of the resonance frequency. The visible light absorption element 10 thermally deforms due to temperature change to thereby change the resonance frequency, and absorbs visible light of the changed resonance frequency.

8 Claims, 14 Drawing Sheets

(51) Int. Cl.
  *G01J 5/48* (2006.01)
  *G02B 5/22* (2006.01)
  *G01J 5/38* (2006.01)
  *G01J 1/02* (2006.01)
  *G01J 5/02* (2006.01)
  *G01J 5/44* (2006.01)
  *G02B 5/20* (2006.01)
  *G01J 1/42* (2006.01)

(52) U.S. Cl.
  CPC ............... *G01J 5/023* (2013.01); *G01J 5/38* (2013.01); *G01J 5/44* (2013.01); *G01J 5/48* (2013.01); *G02B 5/208* (2013.01); *G02B 5/22* (2013.01)

(56) References Cited

U.S. PATENT DOCUMENTS

2010/0284086 A1  11/2010  Novack et al.
2011/0285942 A1  11/2011  Guo et al.
2013/0181129 A1   7/2013  Berte

FOREIGN PATENT DOCUMENTS

JP  2013-525863 A  6/2013
JP  2013-145233 A  7/2013
JP  2014-044164 A  3/2014

OTHER PUBLICATIONS

Shigenori Fujikawa et al., "Fabrication of Arrays of Sub-20-nm Silica Walls via Photolithography and Solution-Based Molecular Coating", pp. 9057-9061, American Chemical Society, Published on Web Sep. 14, 2006.

International Search Report (and English translation) and Written Opinion of the International Searching Authority issued in corresponding application PCT/JP2016/053898, completed Apr. 19, 2016 and dated May 17, 2016.

Office Action issued in counterpart Japanese application 2017-500623 dated Dec. 25, 2019 and mailed on Jan. 7, 2020.

English translation of International Preliminary Report on Patentability issued in corresponding application PCT/JP2016/053898 dated Aug. 22, 2017.

* cited by examiner

[FIG. 1]
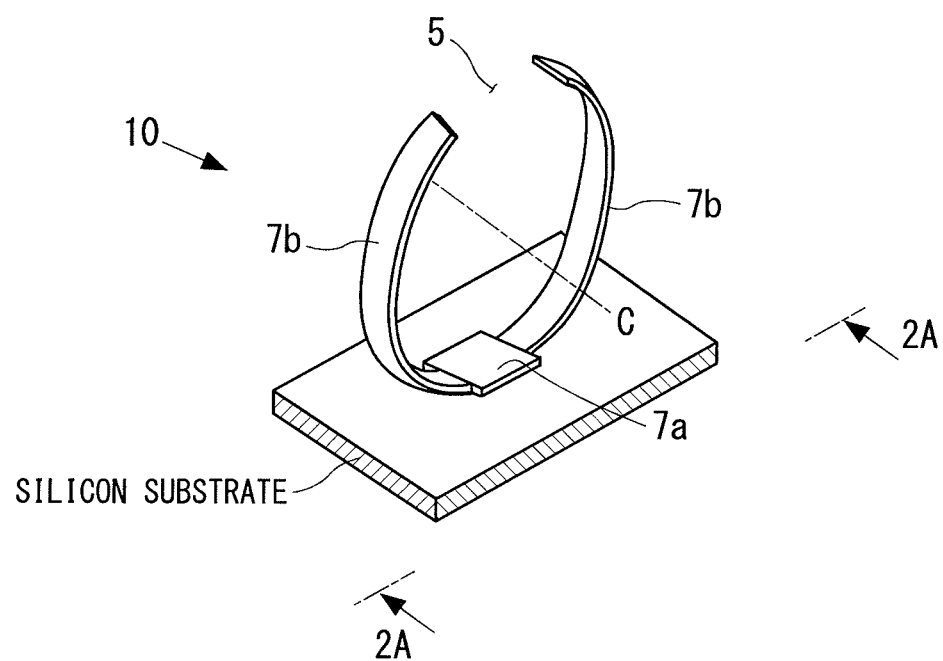

[FIG. 2A]
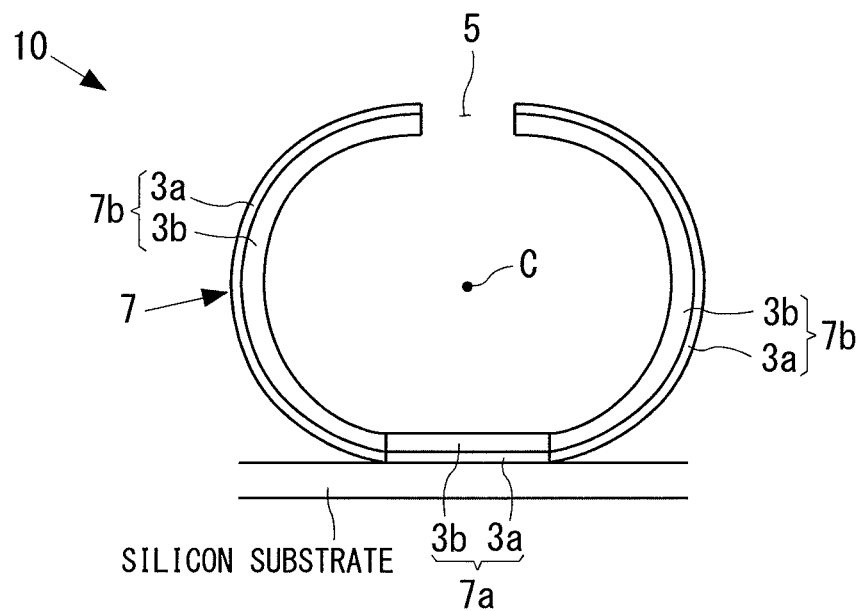
[FIG. 2B]
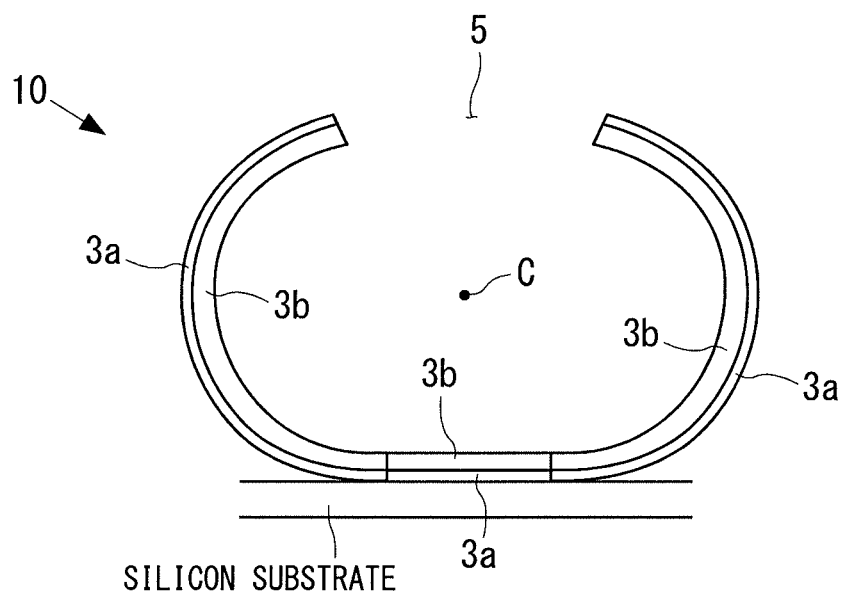

[FIG. 3A]
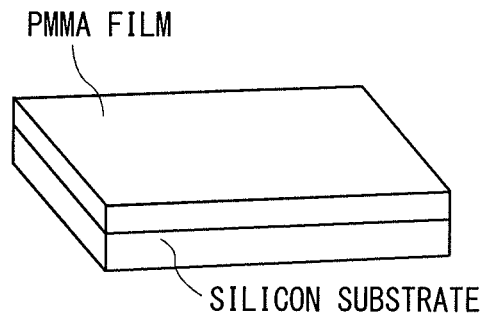
[FIG. 3B]
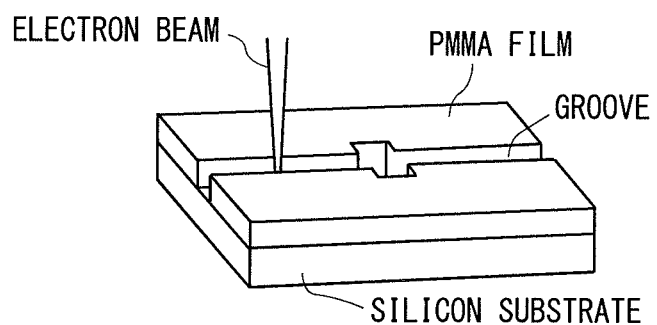
[FIG. 3C]
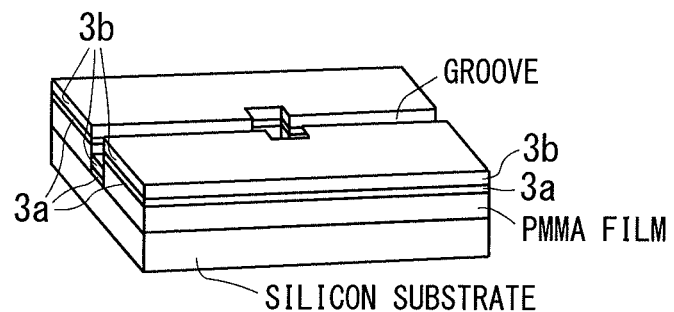

[FIG. 3D]
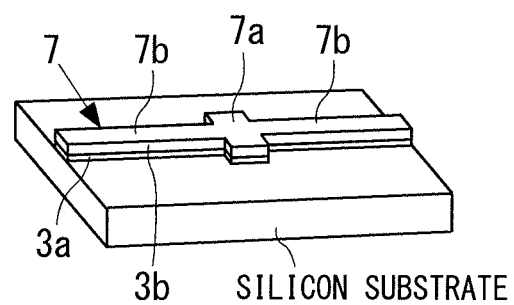
[FIG. 3E]
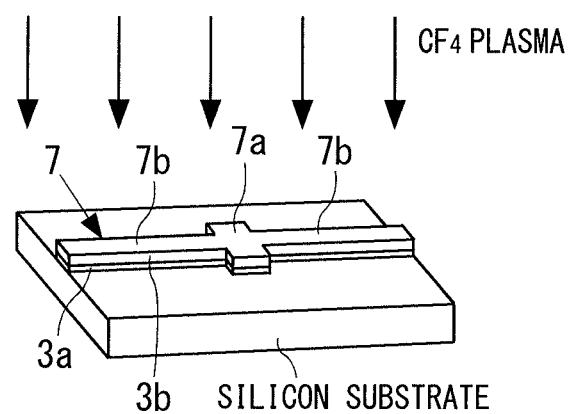

[FIG. 4]
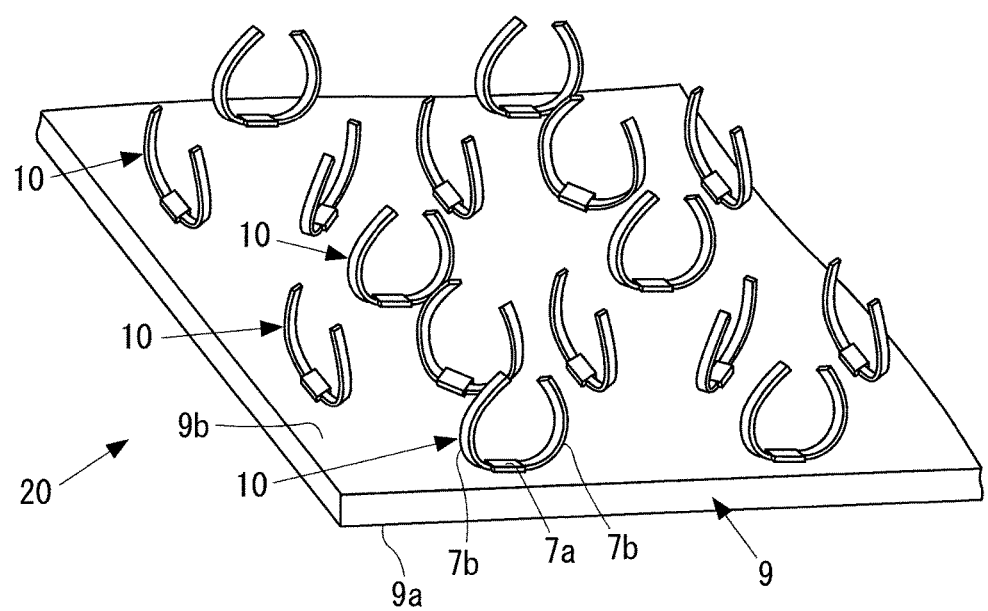

[FIG. 5]
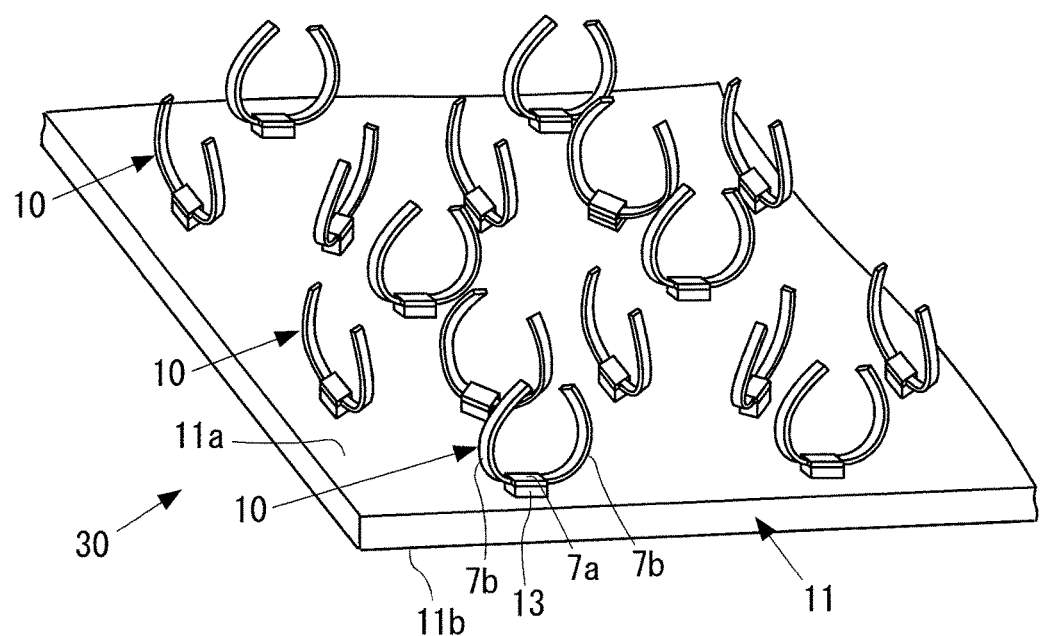

[FIG. 6]
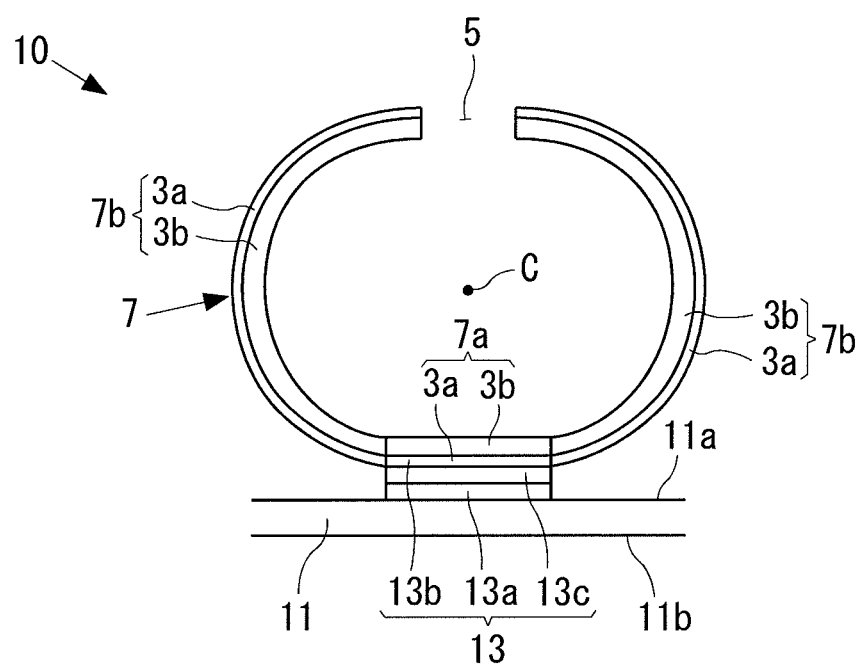

[FIG. 7A]
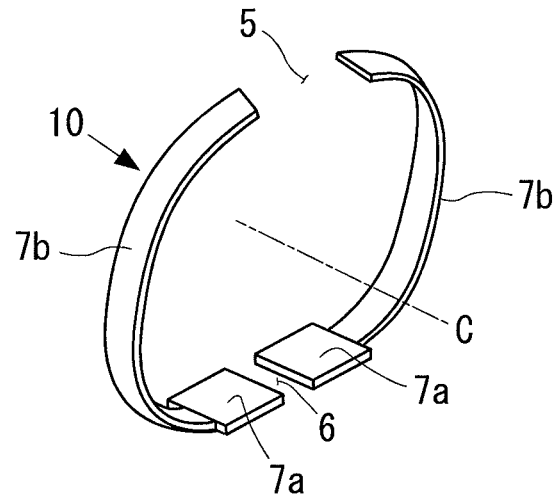
[FIG. 7B]
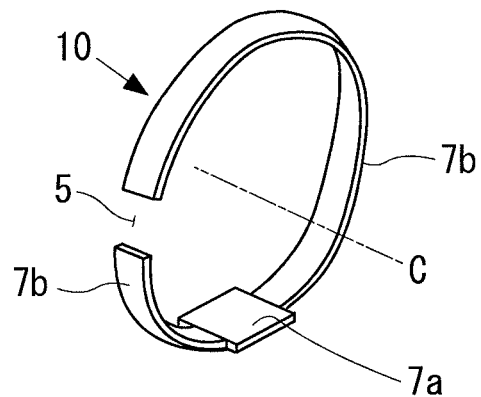
[FIG. 7C]
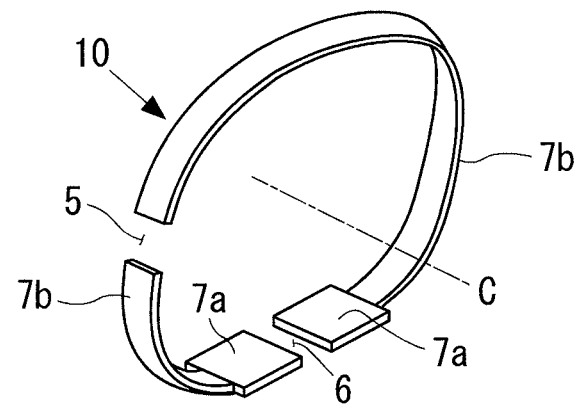

[FIG. 7D]
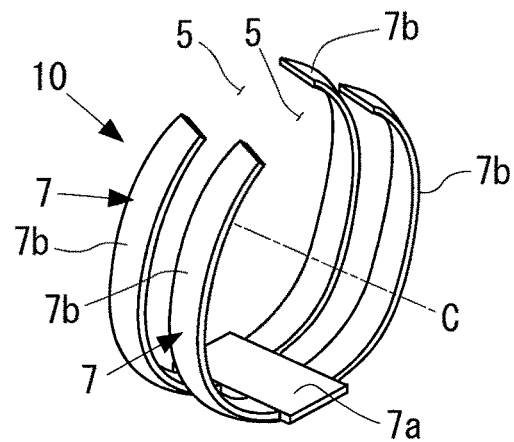
[FIG. 7E]
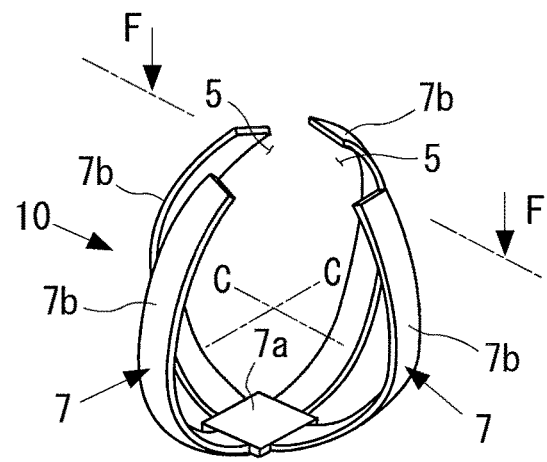
[FIG. 7F]
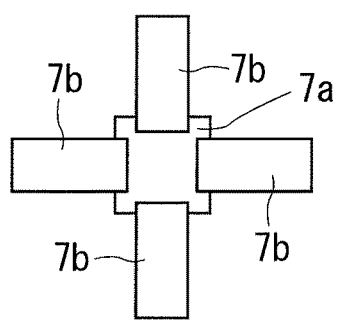

[FIG. 8A]
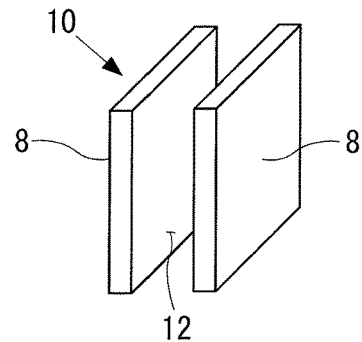
[FIG. 8B]
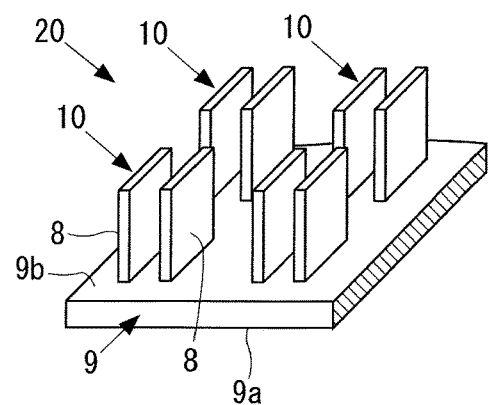
[FIG. 8C]
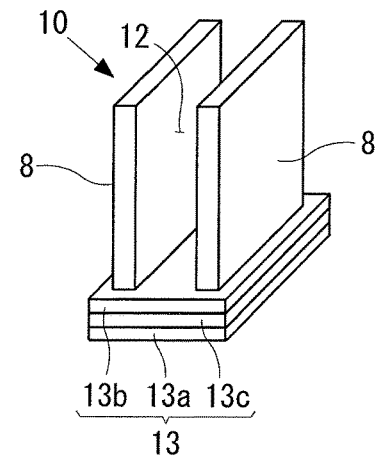
[FIG. 8D]
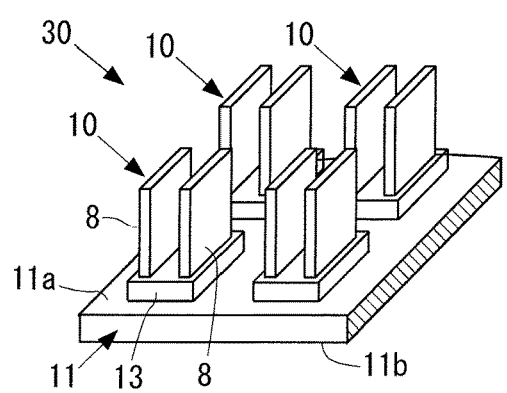

[FIG. 9A]
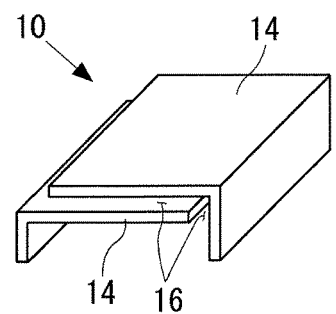
[FIG. 9B]
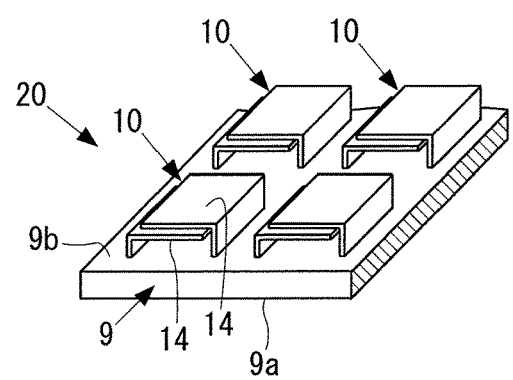
[FIG. 9C]
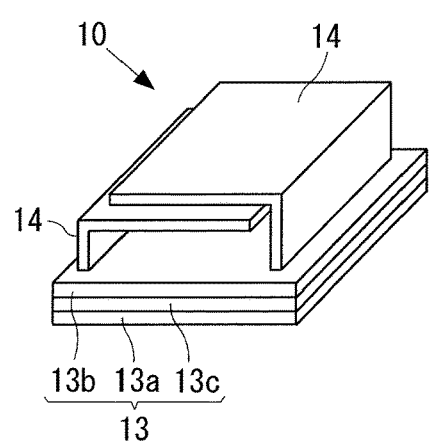
[FIG. 9D]
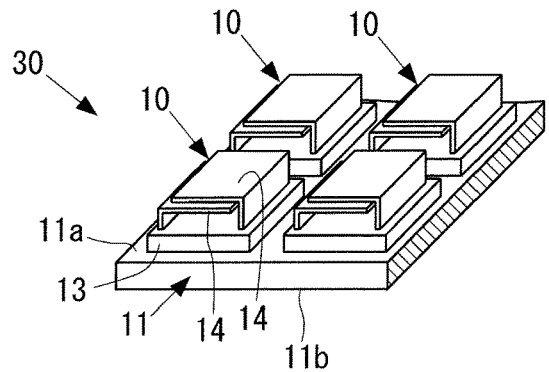

[FIG. 10A]
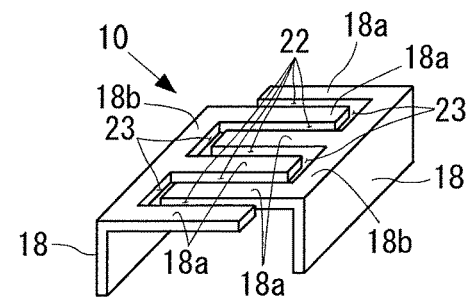
[FIG. 10B]
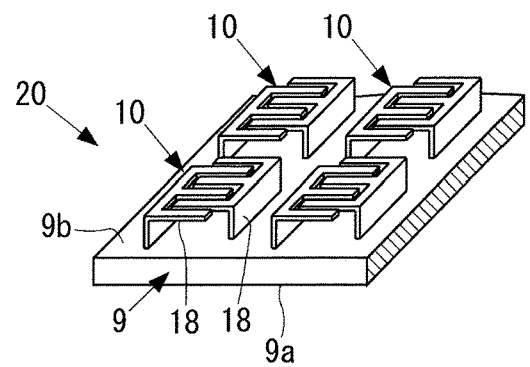
[FIG. 10C]
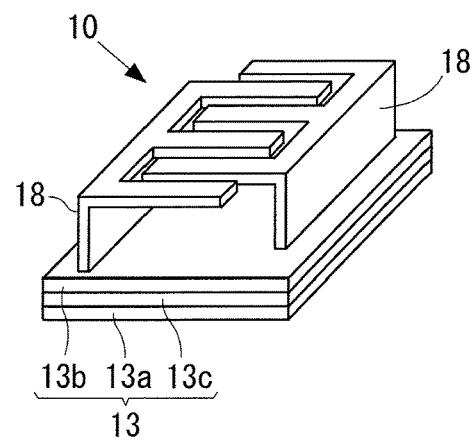
[FIG. 10D]
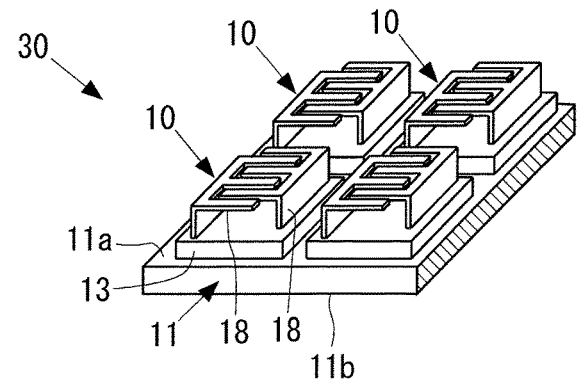

[FIG. 11A]
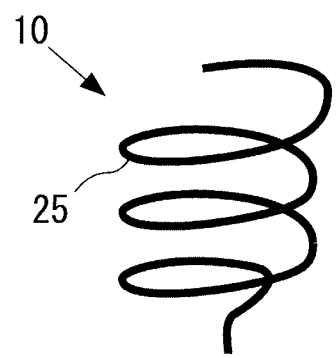
[FIG. 11B]
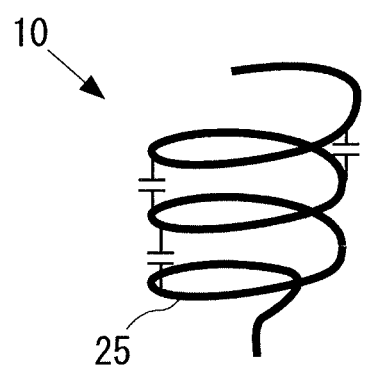
[FIG. 11C]
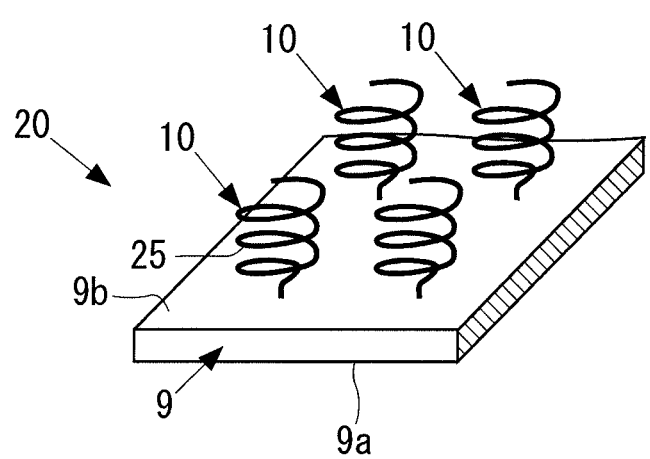

[FIG. 11D]
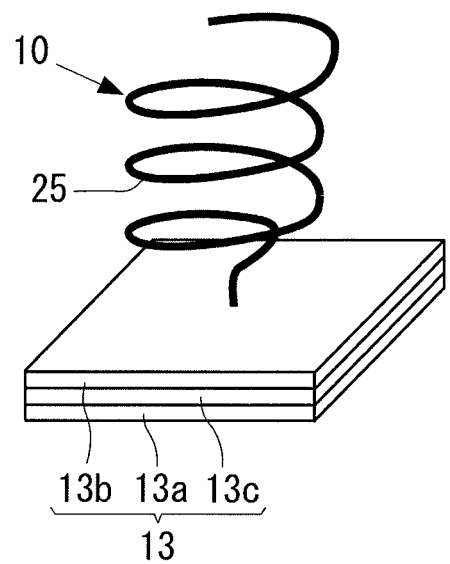
[FIG. 11E]
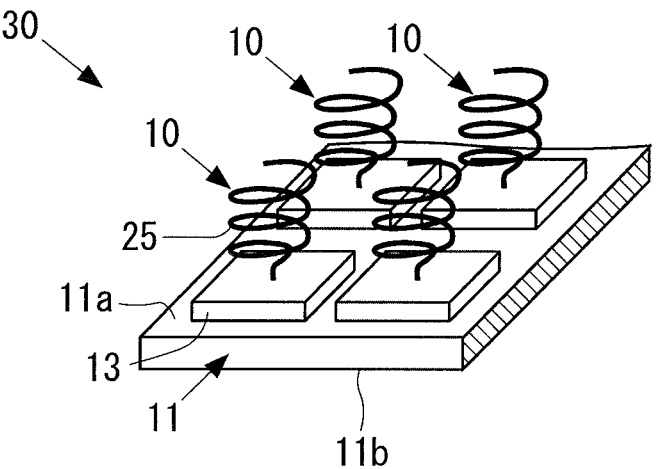

VISIBLE LIGHT ABSORPTION ELEMENT, AND TEMPERATURE VISUALIZATION DEVICE AND INFRARED RAY VISUALIZATION DEVICE EQUIPPED WITH SAME

This is a Continuation Application in the United States of International Patent Application No. PCT/JP2016/053898 filed Feb. 10, 2016, which claims priority on Japanese Patent Application No. 2015/031497, filed Feb. 20, 2015. The entire disclosures of the above patent applications are hereby incorporated by reference.

TECHNICAL FIELD

The present invention relates to a visible light absorption elements that absorb a certain frequency component of incident visible light and reflect or transmit other frequency components of the visible light. More specifically, the present invention relates to a visible light absorption element that changes a frequency component of visible light to reflect or transmit, in accordance with heat received from a target object. Further, the present invention relates to a temperature visualization device and an infrared ray visualization device equipped with such a visible light absorption element.

BACKGROUND ART

Temperature measuring devices are used to measure a temperature of a target object. The temperature measuring devices are based on various principles. Examples of the devices include a device utilizing thermal expansion of a substance, and a device using a thermocouple that converts a temperature difference into a voltage.

These temperature measuring devices generally measure a temperature of a target object in a state in contact with the target object.

Meanwhile, there also are devices, such as thermographic cameras, that measure a temperature of a target object in a state not in contact with the target object. A thermographic camera is described, for example, in Patent Literature (PTL) 1 specified below. The thermographic camera includes a two-dimensional array of infrared detecting elements arranged in two dimensions. The thermographic camera receives infrared rays from a target object, at the two-dimensional array, and on the basis of the received infrared rays, visualizes the temperature distribution of the target object, for example, by displaying the distribution on a display.

The following PTL 2 and Non-Patent Literatures (NPL) 1 and 2 are related to configuration examples of the present invention described later.

CITATION LIST

Patent Literatures

PTL 1: Japanese Patent Publication Laid-open No. 2013-145233
PTL 2: Japanese Patent Publication Laid-open No. 2014-44164

Non-Patent Literatures

NPL 1: Kentaro Miyoshi et al., "Facile Fabrication of Silver Nanofin Array via Electroless Plating", pages 4205-4208, American Chemical Society, Published on Web Mar. 1, 2008

NPL 2: Shigenori Fujikawa et al., "Fabrication of Arrays of Sub-20-nm Silica Walls via Photolithography and Solution-Based Molecular Coating", pages 9057-9061, American Chemical Society, Published on Web Sep. 14, 2006

SUMMARY OF INVENTION

Technical Problem

A thermographic camera that visualizes temperature distribution of an object includes about 300,000 pixels, for example, which greatly differs in terms of the number of pixels from a digital camera that includes several tens of millions of pixels in the same area. This is due to low photon energy of infrared rays, as described below. As infrared rays have low photon energy, the thermographic camera is considerably affected by noise from surrounding environment, making it difficult to increase the S/N ratio. It is thus necessary for the thermographic camera to increase the light-receiving area of each infrared detecting element to ensure satisfactory signal intensity. This leads to an increase in size of each element constituting the two-dimensional array in the thermographic camera, making it difficult to increase the number of pixels of the camera.

It is therefore desired that each element in the two-dimensional array is decreased in size, so that the number of pixels can be increased with the same dimensions.

Further, the configuration (wiring, signal amplifiers, etc.) for processing a detection signal indicating a temperature often becomes large in temperature measuring devices utilizing thermal expansion of a substance, in temperature measuring devices using a thermocouple that converts a temperature difference into a voltage, and in thermographic cameras.

Therefore, it is also desired that the configuration of the device for detecting a temperature can be simplified.

In view of the foregoing, an object of the present invention is to provide a new technique for visualizing, and thus making recognizable, heat representing a temperature or infrared rays closely related to the heat, using an element smaller than the conventional ones or using a configuration simpler than the conventional ones.

Solution to Problem

In order to solve the above-described problem, according to the present invention, there is provided a visible light absorption element that, in accordance with heat received from a target object, changes a frequency component of visible light to reflect or transmit, wherein the visible light absorption element possesses a resonance frequency included in a visible light frequency region, and resonates and absorbs visible light when the visible light of the resonance frequency enters on the element, and the visible light absorption element thermally deforms due to temperature change to thereby change the resonance frequency, and absorbs visible light of the changed resonance frequency.

The visible light absorption element may be configured as follows, for example.

The visible light absorption element includes:
an inductor portion functioning as a coil having inductance (L); and
a capacitor portion functioning as a capacitor having capacitance, wherein the inductor portion and the capacitor portion are connected to each other in series to constitute an LC circuit, the LC circuit possesses the resonance frequency, and thermal deformation of one or both of the inductor portion and the capacitor portion causes the resonance frequency to be changed.

The visible light absorption element has a ring shape, and at a part in a circumferential direction of the ring shape, a space discontinuing the ring shape in the circumferential direction is provided, and the visible light absorption element is formed of a material including a conductive material, and when visible light of the resonance frequency enters on the visible light absorption element, the visible light absorption element resonates with the visible light so that an electric current flows in the circumferential direction in the visible light absorption element.

The visible light absorption element includes first and second layers superimposed to each other in a radial direction of the ring shape, at least one of the first and second layers is formed of the conductive material, and the first and second layers have different thermal expansion coefficients.

According to the present invention, there is provided a temperature visualization device including:

the above-described visible light absorption element; and a sheet-shaped body made of a material having thermal conductivity, wherein the sheet-shaped body includes an attachment surface and an element arrangement surface that are positioned respectively on both sides in a thickness direction thereof, at the time of measuring a temperature of a target object, the attachment surface is attached to a measurement target surface of the target object, and in the element arrangement surface, a large number of the visible light absorption elements are disposed.

In one example, the sheet-shaped body has flexibility.

According to the present invention, there is provided an infrared ray visualization device including:

the above-described visible light absorption element;

an element supporting body in which a large number of the visible light absorption elements are integrated; and at least one infrared ray absorbing portion thermally corrected to the respective visible light absorption elements.

In one example, a large number of the visible light absorption elements are integrally connected to the one infrared ray absorbing portion or a large number of the infrared ray absorbing portions.

Advantageous Effects of Invention

The visible light absorption element according to the present invention possesses a resonance frequency that is changed when the element undergoes thermal deformation such as thermal expansion as the temperature of the element changes, and the element absorbs visible light of the changed resonance frequency. The visible light absorption element thus changes the frequency of the visible light to absorb, in accordance with the heat received. With this configuration, when white light enters on (i.e., is made incident on) the visible light absorption element, the visible light absorption element changes the frequency component (color) of the visible light to reflect or the frequency component of the light to transmit, in accordance with the heat received. It is thus possible to convert the heat into color in the visible light range.

The visible light absorption element as described above makes it possible to obtain, for example, at least one of the following effects (1) and (2).

(1) The visible light absorption element possesses a resonance frequency in a visible light region, so that the element has small dimensions on the order of micrometers to submicrometers, for example. The visible light absorption element of such dimensions can be produced using, for example, electron-beam lithography and vacuum evaporation, as described later. The element for visualizing a temperature can thus be reduced in size.

(2) The frequency component of the visible light that is reflected by the visible light absorption element or the frequency component of the visible light that is transmitted through the visible light absorption element corresponds to the temperature of the target object. It is thus possible to know the temperature of the target object by visually checking, or recognizing using a camera or a spectroscope, the frequency component (color) of the visible light. In this case, the visible light absorption element does not need to be connected to wiring for obtaining a signal representing a temperature, so that the temperature of the target object can be detected using a simple configuration.

BRIEF DESCRIPTION OF DRAWINGS

FIG. 1 is a perspective view illustrating a visible light absorption element according to an embodiment of the present invention;

FIG. 2A is a view in the direction of the arrows 2A-2A in FIG. 1;

FIG. 2B illustrates the visible light absorption element deformed by thermal expansion from the state in FIG. 2A;

FIG. 3A is a diagram illustrating a method of producing a visible light absorption element;

FIG. 3B is another diagram illustrating the method of producing the visible light absorption element;

FIG. 3C is yet another diagram illustrating the method of producing the visible light absorption element;

FIG. 3D is yet another diagram illustrating the method of producing the visible light absorption element;

FIG. 3E is yet another diagram illustrating the method of producing the visible light absorption element;

FIG. 4 is a perspective view illustrating a temperature visualization device according to an embodiment of the present invention;

FIG. 5 is a perspective view illustrating an infrared ray visualization device according to an embodiment of the present invention;

FIG. 6 illustrates one of a large number of the visible light absorption elements in FIG. 5;

FIG. 7A illustrates another configuration example 1 of the visible light absorption element;

FIG. 7B illustrates another configuration example 2 of the visible light absorption element;

FIG. 7C illustrates another configuration example 3 of the visible light absorption element;

FIG. 7D illustrates another configuration example 4 of the visible light absorption element;

FIG. 7E illustrates another form of the configuration example 4 of the visible light absorption element;

FIG. 7F is a view in the direction of the arrows F-F in FIG. 7E;

FIG. 8A illustrates another configuration example 5 of the visible light absorption element;

FIG. 8B illustrates a configuration example of a temperature visualization device including the visible light absorption elements of FIG. 8A;

FIG. 8C illustrates a configuration example of an infrared ray visualization device including the visible light absorption element of FIG. 8A;

FIG. 8D illustrates a state where the configurations of FIG. 8C are arranged on an element supporting body;

FIG. 9A illustrates another configuration example 6 of the visible light absorption element;

FIG. 9B illustrates a configuration example of a temperature visualization device including the visible light absorption elements of FIG. 9A;

FIG. 9C illustrates a configuration example of an infrared ray visualization device including the visible light absorption element of FIG. 9A;

FIG. 9D illustrates a state where the configurations of FIG. 9C are arranged on an element supporting body;

FIG. 10A illustrates another configuration example 7 of the visible light absorption element;

FIG. 10B illustrates a configuration example of a temperature visualization device including the visible light absorption elements of FIG. 10A;

FIG. 10C illustrates a configuration example of an infrared ray visualization device including the visible light absorption element of FIG. 10A;

FIG. 10D illustrates a state where the configurations of FIG. 10C are arranged on an element supporting body;

FIG. 11A illustrates another configuration example 8 of the visible light absorption element;

FIG. 11B is a diagram corresponding to FIG. 11A with symbols of capacitor portions added thereto;

FIG. 11C illustrates a configuration example of a temperature visualization device including the visible light absorption elements of FIG. 11A;

FIG. 11D illustrates a configuration example of an infrared ray visualization device including the visible light absorption element of FIG. 11A; and FIG. 11E illustrates a state where the configurations of FIG. 11D are arranged on an element supporting body.

DESCRIPTION OF EMBODIMENTS

Preferred embodiments of the present invention are described with reference to the drawings. Throughout the drawings, common parts are denoted by the same reference signs, and the overlapping description thereof is omitted.

(Embodiment of Visible Light Absorption Element)

FIG. 1 is a perspective view illustrating a visible light absorption element 10 according to an embodiment of the present invention. FIG. 2A is a view in the direction of the arrows 2A-2A in FIG. 1.

The visible light absorption element 10, in response to heat received from a target object (hereinafter, simply referred to as "target object") whose temperature is to be measured, changes the frequency component of visible light to reflect, or the frequency component of the visible light to transmit therethrough.

The visible light absorption element 10 possesses a resonance frequency (hereinafter, simply referred to as "resonance frequency") that is included in a frequency range of visible light. When visible light of the resonance frequency is incident on the visible light absorption element 10, the visible light absorption element 10 resonates and absorbs the visible light.

The visible light absorption element 10 deforms in accordance with the heat received from a target object, thereby changes the resonance frequency, and absorbs visible light of the changed resonance frequency.

As illustrated in FIGS. 1 and 2A, the visible light absorption element 10 has a ring shape. At a portion in a circumferential direction (hereinafter, simply referred to as "circumferential direction") of the ring shape, the visible light absorption element 10 includes a space 5 that makes the ring shape discontinuous in the circumferential direction. In other words, although the visible light absorption element 10 extends continuously in the circumferential direction, the element 10 does not make a full circle, and is discontinuous in the circumferential direction due to the space 5.

The visible light absorption element 10 is made of materials including an electrically conductive material so that in response to incidence of visible light of the resonance frequency, the visible light absorption element 10 resonates with this visible light to cause an electric current to flow therethrough in the circumferential direction.

As illustrated in FIG. 2A, the visible light absorption element 10 includes a first layer 3a and a second layer 3b superimposed on each other in a radial direction (hereinafter, simply referred to as "radial direction") of the ring shape described above. The first and second layers 3a and 3b are coupled to each other in the radial direction. At least one of the first and second layers 3a, 3b is made of the electrically conductive material described above.

The visible light absorption element 10 with this configuration can be regarded as an LC circuit including a coil and capacitor arranged in series. Here, the coil has inductance L that depends on the radius of the ring shape described above, and the capacitor has capacitance C that depends on the cross-sectional area of portions (arm portions) denoted by 7b in FIG. 1 and the circumferential dimension of the space 5. Out of the visible light incident on the visible light absorption element 10, the visible light having the resonance frequency of this LC circuit is absorbed by the visible light absorption element 10.

In FIGS. 1 and 2A, the visible light absorption element 10 includes a central portion 7a and two arm portions 7b. The two arm portions 7b extend circumferentially from the central portion 7a. Ends of the respective arm portions 7b are apart from each other by the space 5 in the circumferential direction. In other words, the space 5 extends circumferentially from the end of one arm portion 7b to the end of the other arm portion 7b.

The central portion 7a and the two arm portions 7b function as an inductor portion having inductance L, and the ends of the two arm portions 7b (the space 5) function(s) as a capacitor portion having capacitance C. The inductor portion and the capacitor portion constitute an LC circuit. This LC circuit possesses a resonance frequency, which is changed as one or both of the inductor portion and the capacitor portion (in FIG. 1, primarily the two arm portions 7b constituting the inductor portion) undergo thermal deformation due to thermal expansion or the like.

The first layer 3a and the second layer 3b have thermal expansion coefficients different from each other. This makes the visible light absorption element 10 easily deformable in the radial direction when deforming due to thermal expansion. By the thermal deformation of the visible light absorption element 10, the circumferential dimension of the space 5 can be changed significantly.

One of the first and second layers 3a, 3b is preferably made of gold, silver, or aluminum as an electrically conductive material. In this case, the other of the first and second layers 3a, 3b may be made, for example, of nickel, aluminum, copper, an organic compound, an inorganic compound, or alloy (e.g., brass). To increase the ratio of thermal deformation of the visible light absorption element 10 to temperature change of the element 10, it is preferable that the material of the first layer 3a is different from that of the second layer 3b so that the first and second layers 3a and 3b have thermal expansion coefficients different from each other. Each of the central portion 7a and the two arm portions 7b does not have to be formed of the first and second layers 3a and 3b, and may be formed of a single layer.

The visible light absorption element 10 according to the present embodiment described above provides the following functions and effects.

When the ring-shaped visible light absorption element 10 receives heat from a target object, the element 10 thermally deforms from the state in FIG. 2A to the state in FIG. 2B, for example. This changes the circumferential dimension of the space 5 as well as the dimensions of the ring shape of the visible light absorption element 10, leading to change of the resonance frequency of the visible light absorption element 10 within the frequency range of visible light.

Thus, when white light is illuminated on the visible light absorption element 10, the visible light absorption element 10 changes the frequency component (color) of the visible light to reflect or the frequency component of the visible light to transmit, in accordance with the temperature (heat) of the visible light absorption element 10. Accordingly, the heat can be converted into color in the visible light range.

Further, the visible light absorption element 10 possesses a resonance frequency in the visible light region, so that the dimensions of this element 10 become small, for example on the order of micrometers to submicrometers.

The resonance frequency component of visible light incident on the visible light absorption element 10 is absorbed by the visible light absorption element 10 the most when a vibration direction of a magnetic field of this incident visible light matches the direction (the direction perpendicular to the paper surface of FIG. 2A) of the central axis C of the visible light absorption element 10.

The spectrum of the visible light reflected by the visible light absorption element 10, or the spectrum of the visible light transmitted through the visible light absorption element 10 indicates a temperature or temperature distribution of the target object.

Accordingly, recognizing such spectrum of the visible light visually or using a spectral device makes it possible to grasp the temperature or temperature distribution of the target object. In this case, the visible light absorption element 10 does not need to be connected to wiring for obtaining a temperature detection signal. It is therefore possible to detect the temperature or temperature distribution of a target object with a simple configuration.

FIGS. 3A to 3E illustrate a method for producing the visible light absorption element 10 described above. The method for producing the visible light absorption element 10 is described on the basis of FIGS. 3A to 3E.

Firstly, as illustrated in FIG. 3A, a polymethyl methacrylate (PMMA) resist material which is reactive to an electron beam is applied to a surface of a silicon substrate. In other words, a PMMA film is formed on a surface of the silicon substrate.

Next, electron-beam lithography is used to draw a long and narrow ribbon pattern groove in the PMMA film. The ribbon pattern has a larger groove width only at its central portion. The PMMA film having the ribbon pattern drawn thereon is then developed. Thereby, the portion of the PMMA film irradiated with an electron beam is removed, and the narrow groove of the ribbon pattern is formed in the PMMA film, as illustrated in FIG. 3B.

Next, as illustrated in FIG. 3C, first and second layers 3a and 3b are vapor-deposited in the silicon substrate using a technique of vacuum evaporation or sputtering. For example, the first layer 3a is a thin film of nickel (Ni), and the second layer 3b is a thin film of gold (Au).

Thereafter, removing the remaining PMMA film leaves only the first and second layers 3a and 3b directly affixed to the silicon substrate in the narrow groove of ribbon pattern, as illustrated in FIG. 3D. In other words, a ribbon-shaped portion 7 made of the first and second layers 3a and 3b of the ribbon pattern is formed. The ribbon-shaped portion 7 includes a central portion 7a, having a wider width in the direction orthogonal to the longitudinal direction (hereinafter, simply referred to as "longitudinal direction") of the ribbon-shaped portion 7, and two arm portions 7b linearly extending in the longitudinal direction from the central portion 7a.

Next, the silicon substrate is subjected to dry etching using carbon tetrafluoride ($CF_4$) gas, so that the silicon substrate alone is etched. When etching is performed isotropically at this time, not only the surface of the silicon substrate, but also the portion at the back of the ribbon-shaped portion 7 (i.e. the portion beneath the ribbon-shaped portion 7 in FIG. 3E) is etched. In this case, stopping the etching before complete removal of the portion (the portion in contact with the central portion 7a) of the silicon substrate at the back of the central portion 7a results in a configuration in which the ribbon-shaped portion 7 is fixed to the silicon substrate only at the central portion 7a, and the two arm portions 7b are apart from and extending above the surface of the silicon substrate. When this substrate is taken from the vacuum chamber to the atmosphere, the respective arm portions 7b are curved, as illustrated in FIGS. 1 and 2A, due to the difference in residual stress acting on the first and second layers 3a and 3b (for example, nickel of the first layer 3a and gold of the second layer 3b), so that a freestanding, ring structure is formed on the surface of the silicon substrate. The ribbon-shaped portion 7 formed in the ring shape by the curving of the arm portions 7b is the visible light absorption element 10 described above. In other words, the visible light absorption element 10 includes the central portion 7a and the two curved arm portions 7b.

For the ring-shaped visible light absorption element 10 produced as described above, the cross-sectional area of the arm portions 7b, the circumferential length of the arm portions 7b, the radius of the ribbon-shaped portion 7, the dimension of the space 5, and the like are designed so that the resonance frequency of the visible light absorption element 10 is set to be within the frequency range of visible light. In other words, the dimensions of various parts of the ribbon-shaped portion 7 are designed to ensure that the resonance frequency of the visible light absorption element 10 is within the frequency range of visible light in both of a case where the visible light absorption element 10 has undergone no thermal deformation and a case where the visible light absorption element 10 has undergone thermal deformation at various temperatures. The ribbon-shaped portion 7 has a thickness in the radial direction on the order of nanometers to micrometers, for example.

The visible light absorption element 10 according to the present embodiment can be produced, as in the above-described method, by drawing its shapes and dimensions by electron-beam lithography and by performing vacuum evaporation and dry etching on the drawn portions. With this producing method, it is possible to produce the ring-shaped visible light absorption element 10 having the dimensions on the order of micrometers to submicrometers. In other words, it is possible to produce a small visible light absorption element 10.

(Temperature Visualization Device)

The following describes a temperature visualization device 20 including the visible light absorption element 10 described above.

FIG. 4 is a perspective view illustrating the temperature visualization device 20 according to an embodiment of the present invention. The temperature visualization device 20 includes a large number of the visible light absorption elements 10 and a sheet-shaped body 9.

A large number of the visible light absorption elements 10 are identical in configuration to each other (i.e., identical in dimension, shape, and material). Each visible light absorption element 10 has the same configuration as the visible light absorption element 10 illustrated in FIG. 1.

The sheet-shaped body 9 is attached to a measurement target surface of a target object. The sheet-shaped body 9 includes an attachment surface 9a and an element arrangement surface 9b that are positioned respectively on both sides in the thickness direction of the body 9. At the time of measuring a temperature of a target object, the attachment surface 9a is attached to a measurement target surface of the target object. In the element arrangement surface 9b, a large number of the visible light absorption elements 10 are disposed in an array.

The sheet-shaped body 9 is the silicon substrate in FIGS. 1 to 3E described above. In this case, each visible light absorption element 10 may be formed simultaneously on the same silicon substrate, in the same or similar manner as in the producing method described above. In the case of forming the sheet-shaped body 9 using a material different from silicon, the silicon substrate is replaced with one made of the different material, in the above description and in FIGS. 1 to 3E.

FIG. 4 illustrates a part of the element arrangement surface 9b of the sheet-shaped body 9. In FIG. 4, a large number of the visible light absorption elements 10 each having an orientation (corresponding to the direction of the central axis C in FIG. 1) are arranged (i.e., integrated) in the element arrangement surface 9b such that plural varieties of the orientations (in FIG. 4, four orientations) of the visible light absorption elements 10 exist. When visible light is incident on the visible light absorption element 10, the resonance frequency component of the visible light is absorbed by the visible light absorption element 10 to the greatest extent when the vibration direction of the magnetic field of the visible light coincides with the direction of the central axis C of the visible light absorption element 10. For this reason, for example in the case of making unpolarized white light incident on the element arrangement surface 9b, a large number of the visible light absorption elements 10 are arranged such that plural varieties of the orientations of the elements 10 exist, as illustrated in FIG. 4. Meanwhile, in the case of making linearly polarized white light incident on the element arrangement surface 9b, a large number of the visible light absorption elements 10 may be arranged in the element arrangement surface 9b such that one variety of the orientation of the elements 10 exists, and setting may be made such that the vibration direction of the magnetic field of the white light matches the orientation (the direction of the central axis C in FIG. 1) of a large number of the visible light absorption elements 10.

The sheet-shaped body 9 is made of a material having thermal conductivity. Thereby, in the state where the attachment surface 9a of the sheet-shaped body 9 is attached (preferably, closely attached) to the measurement target surface of a target object, the sheet-shaped body 9 transfers the heat of the measurement target surface to each of the visible light absorption elements 10 on the element arrangement surface 9b. Consequently, each visible light absorption element 10 is thermally deformed in accordance with the heat received from the measurement target surface of the target object via the sheet-shaped body 9 so that the resonance frequency of each visible light absorption element 10 is thus changed.

The sheet-shaped body 9 preferably has flexibility. When the sheet-shaped body 9 is flexible and easily deformable, the sheet-shaped body 9 can be deformed to conform to the shape of the measurement target surface of a target object. This ensures that the attachment surface 9a of the sheet-shaped body 9 is closely attached to the measurement target surface, even if the measurement target surface is not flat. In this case, the sheet-shaped body 9 having flexibility is made of polymer, for example.

As another option, the sheet-shaped body 9 may be made of glass, metal, crystal, or ceramic, for example. However, the sheet-shaped body 9 is not limited to the above description, and may be made of any other substance as long as the substance has durability in the temperature range of the measurement target surface.

Examples of the target object include an engine of an automobile, a furnace wall of a blast furnace, etc. However, the target object is not limited to them, and may be any one the temperature distribution of which is desired to be measured.

The temperature visualization device 20 according to the present embodiment described above provides the following functions and effects.

In the state where the attachment surface 9a of the sheet-shaped body 9 is attached (preferably, closely attached) to the measurement target surface of a target object, the temperature distribution on the element arrangement surface 9b of the sheet-shaped body 9 becomes distribution according to the temperature distribution on the measurement target surface. The distribution, on the element arrangement surface 9b, of the respective resonant frequencies of a large number of the visible light absorption elements 10 thus becomes distribution according to the temperature distribution on the element arrangement surface 9b, i.e., the distribution according to the measurement target surface. Accordingly, when white light is made incident on the element arrangement surface 9b, color of reflected light that is the white light reflected from the element arrangement surface 9b, or color of transmitted light that is the white light transmitted through the element arrangement surface 9b is distributed according to the temperature distribution on the measurement target surface. In other words, the color distribution on the element arrangement surface 9b becomes distribution according to the temperature distribution on the measurement target surface. Thus, the temperature visualization device 20 can visualize the temperature distribution on the measurement target surface as the distribution of color on the element arrangement surface 9b.

Further, the dimensions of each visible light absorption element 10 can be made to be on the order of micrometers to submicrometers, so that a large number of the visible light absorption elements 10 can be arranged on the element arrangement surface 9b with extremely high density. For example, when the element arrangement surface 9b is virtually partitioned into a large number of square regions in contact with each other, assuming that one side of each square region is on the order of micrometers to submicrometers, one visible light absorption element 10 can be arranged in each square region.

The temperature distribution on the measurement target surface, i.e., the color distribution on the element arrangement surface 9b visualized by the temperature visualization device 20 may be recognized in the following manners (A) and (B).

(A) in the Case of Visual Checking

A person can visually check the element arrangement surface 9b, to recognize the temperature distribution on the measurement target surface from the color distribution on the element arrangement surface 9b.

In this case, the relation between the color and temperature of the element arrangement surface 9b can be obtained in advance. Specifically, the element arrangement surface 9b is heated or cooled to a known temperature, and color data in which the temperature is associated with the color of the element arrangement surface 9b at that time is obtained in advance. Such color data is obtained for each temperature of the element arrangement surface 9b. Then, on the basis of the color data of each temperature thus obtained in advance, a person can recognize the temperature distribution on the measurement target surface of a target object, by looking at the color distribution on the element arrangement surface 9b.

(B) In the Case of Providing a Detection Device

A detection device is used to acquire color distribution on or color of the element arrangement surface 9b of the sheet-shaped body 9.

The detection device may be one including a spectroscope and a spectrum data generating unit, for example. When the element arrangement surface 9b is irradiated with white light, the spectroscope separates the white light (visible light) reflected from the element arrangement surface 9b, into respective frequency components. On the basis of the respective frequency components separated by the spectroscope, the spectrum data generating unit generates spectrum data of the white light reflected from the element arrangement surface 9b. The spectrum data indicates the intensity of each frequency component of the visible light reflected from the element arrangement surface 9b. On the basis of such spectrum data, the temperature of the element arrangement surface 9b, i.e., the temperature of the measurement target surface can be detected quantitatively and with high sensitivity.

In this case, the relation between the color of the element arrangement surface 9b and the spectrum data described above can be obtained in advance. Specifically, the element arrangement surface 9b is heated or cooled to a known temperature, and spectrum data in which the temperature is associated with the above-described spectrum data at that time is obtained in advance. Such spectrum data is obtained for each temperature of the element arrangement surface 9b. On the basis of the spectrum data by temperature thus obtained and the spectrum data generated by the above-described spectrum data generating unit at the time of actual measurement of the temperature, the temperature of the element arrangement surface 9b, i.e., the temperature of the measurement target surface can be detected quantitatively and with high sensitivity.

The spectrum data generated by the spectrum data generating unit may be displayed by a display device. In this case, on the basis of the spectrum data of each temperature obtained in advance, a person can recognize the temperature of the measurement target surface of the target object, by looking at the spectrum data displayed.

As another option, the detection device may include a camera utilizing visible light, and a display device. The camera takes an image of the element arrangement surface 9b irradiated with white light, to acquire color image data of the element arrangement surface 9b. At this time, the camera generates the color image data on the basis of the white light reflected from the element arrangement surface 9b. The display device displays a color image based on the color image data acquired by the camera. The color image of the element arrangement surface 9b displayed by the display device corresponds to the temperature distribution on the element arrangement surface 9b of the sheet-shaped body 9, i.e., the temperature distribution on the measurement target surface of the target object. Thus, a person can recognize the temperature distribution of the target object, by looking at the displayed color image of the element arrangement surface 9b.

In this case, the color data described above is obtained for each temperature of the element arrangement surface 9b, in advance. On the basis of each color data thus obtained in advance, a person can recognize the temperature distribution on the measurement target surface of the target object, by looking at the displayed color image of the element arrangement surface 9b.

(Infrared Ray Visualization Device)

The following describes an infrared ray visualization device 30 including the visible light absorption element 10 described above.

The infrared ray visualization device 30 receives infrared rays from a target object, and visualizes heat produced by the received infrared rays.

FIG. 5 is a perspective view illustrating the infrared ray visualization device 30 according to an embodiment of the present invention. The infrared ray visualization device 30 includes a large number of the visible light absorption elements 10, an element supporting body 11, and an infrared ray absorbing portion 13.

A large number of the visible light absorption elements 10 are identical in configuration to each other (i.e., identical in dimension, shape, and material). Each visible light absorption element 10 has the same configuration as the visible light absorption element 10 illustrated in FIG. 1.

The element supporting body 11 includes an element arrangement surface 11a. On the element arrangement surface 11a, a large number of the visible light absorption elements 10 are arranged (i.e., integrated). The element supporting body 11 is plate-shaped, and includes an opposite surface 11b on the side opposite to the element arrangement surface 11a in the thickness direction.

FIG. 6 illustrates one visible light absorption element 10 among a large number of the visible light absorption elements 10 in FIG. 5. Each of a large number of the visible light absorption elements 10 in FIG. 5 has the same configuration.

The infrared ray absorbing portion 13 is thermally connected to the visible light absorption element 10. As illustrated in FIGS. 5 and 6, for each of the visible light absorption elements 10, one infrared ray absorbing portion 13 is provided to be thermally connected to the element 10 concerned. In FIG. 5, a large number of the infrared ray absorbing portions 13 is each disposed at the same position as that of the corresponding visible light absorption elements 10. In other words, a large number of the infrared ray absorbing portions 13 are disposed on the element arrangement surface 11a, and the corresponding visible light absorption elements 10 are disposed on the respective infrared ray absorbing portions 13. Thus, a large number of the visible light absorption elements 10 are disposed in the element arrangement surface 11a via the corresponding infrared ray absorbing portions 13. A large number of the visible light absorption elements 10 are preferably coupled integrally to the corresponding large number of the infrared ray absorbing portions 13, respectively, as in the configuration illustrated in FIGS. 5 and 6, for example.

The infrared ray absorbing portion 13 includes first and second metal layers 13a and 13b made of metal, and a dielectric layer 13c made of a dielectric. The dielectric layer 13c is sandwiched between the first and second metal layers 13a and 13b. In other words, the first metal layer 13a, the dielectric layer 13c, and the second metal layer 13b are superimposed on each other in this order. In the example in FIG. 6, the second metal layer 13b is shared by the infrared ray absorbing portion 13 and the visible light absorption element 10. In other words, the second metal layer 13b is also the first layer 3a of the visible light absorption element 10, and also functions as the first layer 3a.

The infrared ray absorbing portion 13 absorbs infrared rays in the following manner. When infrared rays are incident on the infrared ray absorbing portion 13, plasmons are excited in the infrared ray absorbing portion 13. The width (in the left-and-right direction in FIG. 6) of the interface between the dielectric layer 13c and the second metal layer 13b is designed so that the plasmons are excited in this manner. The infrared rays incident on the infrared ray absorbing portion 13 are converted into surface plasmons to be confined in the infrared ray absorbing portion 13. Thereby, the infrared rays are absorbed by the infrared ray absorbing portion 13. The surface plasmons are changed to heat, which is in turn transferred to the visible light absorption element 10 (for more details, see PTL 2 mentioned above).

Each visible light absorption element 10 and each infrared ray absorbing portion 13 may be formed in the element supporting body 11 using electron-beam lithography, vacuum evaporation, and the like.

For example, in the case of producing an infrared ray visualization device 30 in the manner of FIGS. 3A to 3E, in the process in FIG. 3C, the first metal layer 13a, the dielectric layer 13c, and the second metal layer 13b are superimposed on each other in each position (within the groove in FIG. 3C) where each ribbon-shaped portion 7 is to be arranged, and subsequently, the ribbon-shaped portions 7 are superimposed thereon (here, the second metal layer 13b functions also as the first layer 3a of the ribbon-shaped portion 7). In this case, the processes in the other stages may be identical to those described above with reference to FIGS. 3A to 3E.

The element supporting body 11 may be a silicon substrate, or may be one made of another material.

In the case where the element supporting body 11 is made of a material that transmits infrared rays, the element supporting body 11 may be set such that the opposite surface 11b faces a target object, and the infrared rays from the target object is made incident on the opposite surface 11b.

In the case where the first and second layers 3a and 3b of the visible light absorption element 10 transmit infrared rays, the element supporting body 11 may be set such that the element arrangement surface 11a faces a target object, and the infrared rays from the target object is made incident on the element arrangement surface 11a.

FIG. 5 illustrates a part of the element arrangement surface 11a of the element supporting body 11. In FIG. 5, a large number of the visible light absorption elements 10 each having an orientation (corresponding to the direction of the central axis C in FIG. 6) are arranged in the element arrangement surface 11a such that plural varieties of the orientations (in FIG. 5, four orientations) of the visible light absorption elements 10 exist. When visible light is incident on the visible light absorption element 10, the resonance frequency component of the visible light is absorbed by the visible light absorption element 10 to the greatest extent when the vibration direction of the magnetic field of the visible light coincides with the direction of the central axis C of that visible light absorption element 10. For this reason, for example in the case of making unpolarized white light incident on the element arrangement surface 11a, a large number of the visible light absorption elements 10 are arranged such that plural varieties of the orientations of the elements 10 exist, as illustrated in FIG. 5. Meanwhile, in the case of making linearly polarized white light incident on the element arrangement surface 11a, a large number of the visible light absorption elements 10 may be arranged in the element arrangement surface 11a such that one variety of the orientation of the elements 10 exists, and setting may be made such that the vibration direction of the magnetic field of the white light matches the orientation (the direction of the central axis C in FIG. 6) of a large number of the visible light absorption elements 10.

The infrared ray visualization device 30 according to the present embodiment described above provides the following functions and effects.

Each infrared ray absorbing portion 13, when receiving infrared rays emitted from a target object, generates heat, which is transferred to the corresponding visible light absorption element 10. With this heat, each visible light absorption element 10 is thermally deformed, so that the frequency component of the visible light to absorb is changed in accordance with the deformation amount. Thus, the distribution of color of the visible light absorption elements 10 (for example, located at the same positions as those of the infrared ray absorbing portions 13 at the respective positions) corresponding to the infrared ray absorbing portions 13 at the respective positions in the element supporting body 11 also becomes distribution according to the distribution of the infrared rays incident on the element 10. This makes it possible to measure or recognize the distribution of the irradiation infrared rays, from the color of a large number of the visible light absorption elements 10.

In FIGS. 5 and 6, each infrared ray absorbing portion 13 may be disposed on top of the corresponding visible light absorption element 10, or adjacent to the corresponding visible light absorption element 10 in the direction along the element arrangement surface 11a, as long as the infrared ray absorbing portion 13 is thermally connected to the corresponding visible light absorption element 10. Further, a large number of the infrared ray absorbing portions 13 may be formed integrally so as to be are thermally connected to each other. In other words, a large number of the infrared ray absorbing portions 13 may be integrated to constitute a single infrared ray absorbing portion. For example, the first metal layer 13a and the dielectric layer 13c in FIG. 6 may extend over the entirety of the element arrangement surface 11a so as to be shared by a large number of the visible light absorption elements 10 in FIG. 5. In this case, a large number of the visible light absorption elements 10 may be coupled integrally to the single infrared ray absorbing portion 13 described above.

The temperature distribution or temperature of the target object visualized by the infrared ray visualization device 30 can be measured or recognized in the following manner.

Infrared rays from a target object are made incident on the element arrangement surface 11a or the opposite surface 11b. Thereby, the infrared rays are absorbed by each infrared ray absorbing portion 13, and the heat is transferred from each infrared ray absorbing portion 13 to the corresponding visible light absorption element 10.

In this state, when white light is made incident on the element arrangement surface 11a or the opposite surface 11b by an appropriate illumination device, for example, part of the white light (visible light) is absorbed by each visible light absorption element 10 in the element arrangement surface 11a, and the visible light after absorption is reflected from the element supporting body 11 or transmitted through the element supporting body 11. On the basis of such reflected light or transmitted light of the visible light, a detection device acquires spectrum data or color image data.

Here, in the case of a detection device that acquires spectrum data, the detection device includes a spectroscope and a spectrum data generating unit, and functions as follows. The spectroscope receives from the element supporting body 11 the reflected light or transmitted light of the visible light described above, and separates the reflected or transmitted light into respective frequency components. On the basis of the respective frequency components separated by the spectroscope, the spectrum data generating unit generates spectrum data of the reflected light or transmitted light of the visible light described above. The spectrum data indicate the intensity of each frequency component of the visible light. On the basis of such spectrum data, the temperature of the element arrangement surface 11a, i.e., the temperature of the target object can be detected (measured) quantitatively and with high sensitivity.

In this case, the temperature of the element arrangement surface 11a, i.e., the temperature of the measurement target surface can be detected quantitatively and with high sensitivity on the basis of the above-described spectrum data for each temperature obtained in advance and the spectrum data generated by the above-described spectrum data generating unit at the time of actual measurement.

The spectrum data generated by the spectrum data generating unit may be displayed by a display device. In this case, on the basis of the spectrum data for each temperature obtained in advance, a person can measure or recognize the temperature of the measurement target surface of the target object, by looking at the spectrum data displayed.

In the case of a detection device that acquires color image data, the detection device includes a camera utilizing visible light, and a display device, and functions as follows. The camera receives from the element supporting body 11 the reflected light or transmitted light of the visible light described above, and generates color image data of the element arrangement surface 11a or the opposite surface 11b on the basis of the reflected light or transmitted light. A color image based on the generated color image data is displayed by the display device. The color distribution of this color image corresponds to the temperature distribution of the target object. This color image is compared with the above-described color data of each temperature acquired in advance, so that the temperature distribution of the target object can be measured or recognized.

The present invention is not limited to the above-described embodiments, and various modifications can be made within the scope not departing from the essence of the present invention.

For example, any one of the following Modifications 1 to 3 may be adopted, or two or more of the Modifications 1 to 3 may be arbitrarily combined. In these cases, the contents not described below may be the same as described above.

(Modification 1)

The visible light absorption element according to the present invention is not limited to the configuration described above, and it is sufficient that a visible light absorption element changes a frequency component of visible light to reflect or transmit, in accordance with heat received from a target object. In other words, it is sufficient that the visible light absorption element of the present invention is configured to possess a resonance frequency included in the frequency range of visible light, absorb visible light with the same frequency as the resonance frequency, change the resonance frequency when being thermally deformed due to thermal expansion or the like, and then absorb visible light with the changed resonance frequency.

Specifically, the visible light absorption element can be configured to have an inductor portion that functions as a coil having inductance L, and a capacitor portion that functions as a capacitor having capacitance C. The inductor portion and the capacitor portion are connected in series so as to constitute an LC circuit. This LC circuit possesses a resonance frequency, which is changed as one or both of the inductor portion and the capacitor portion undergo thermal deformation such as thermal expansion. Such an LC circuit can be produced using metamaterials.

For example, the visible light absorption element 10 may be configured, for example, as in the following Configuration Examples 1 to 8.

Configuration Example 1

As illustrated in FIG. 7A, in a ring-shaped visible light absorption element 10, a plurality of (in this figure, two) spaces 5, 6 may be provided in the circumferential direction of the ring shape, the spaces making the ring shape discontinuous in the circumferential direction.

In this Configuration Example 1, a plurality of (in the figure, two) capacitor portions corresponding respectively to a plurality of spaces 5, 6 are connected in series. This reduces the capacitance C of the visible light absorption element 10. Thus, the resonance frequency of the visible light absorption element 10 as the LC resonator becomes high, making it readily possible to set the resonance frequency of the visible light absorption element 10 to be within the frequency range of visible light.

Configuration Example 2

As illustrated in FIG. 7B, the two arm portions 7b in the visible light absorption element 10 may be made to have different circumferential lengths from each other. This enables adjustment of the resonance frequency of the visible light absorption element 10.

Configuration Example 3

Configuration Examples 1 and 2 described above may be combined, as illustrated in FIG. 7C. This increases the degree of freedom regarding the adjustment of the resonance frequency of the visible light absorption element 10.

Configuration Example 4

More than one pair of arm portions 7b may be coupled to a single central portion 7a, as illustrated in FIGS. 7D and 7E.

Here, a pair of arm portions 7b consists of two arm portions 7b. FIG. 7F is a view in the direction of the arrows F-F in FIG. 7E.

In FIG. 7D, one ribbon-shaped portion 7 of a ring shape configured with one pair of arm portions 7b and the central portion 7a has a central axis C that is in parallel with a central axis C of the other ribbon-shaped portion 7 of a ring shape configured with the other pair of arm portions 7b and the central portion 7a.

In FIG. 7E, one ribbon-shaped portion 7 of a ring shape configured with one pair of arm portions 7b and the central portion 7a has a central axis C whose direction crosses (or, perpendicular to) a direction of a central axis C of the other ribbon-shaped portion 7 of a ring shape configured with the other pair of arm portions 7b and the central portion 7a. This provides similar effects as those obtained from the configuration as illustrated in FIG. 4 or 5 where a large number of the visible light absorption elements 10 are arranged such that plural varieties of the orientations of the elements 10 exist.

Configuration Example 5

The visible light absorption element 10 may be configured with two flat-plate-shaped portions 8 arranged at an interval from each other (preferably in parallel), as illustrated in FIG. 8A. Each flat-plate-shaped portion 8 has a flat plate shape and is made of metal. The two flat-plate-shaped portions 8 arranged at an interval from each other also have inductance L, so that these two flat-plate-shaped portions 8 constitute an inductor portion. Further, the two flat-plate-shaped portions 8 constitute a capacitor portion by a space 12 between these flat-plate-shaped portions 8. As the two flat-plate-shaped portions 8 are thermally deformed (for example, curved), the spacing therebetween changes, causing the capacitance of the capacitor portion to change.

In the case where the visible light absorption element 10 in FIG. 8A is used to form a temperature visualization device 20, the temperature visualization device 20 has a configuration, as illustrated in FIG. 8B, in which a large number of the visible light absorption elements 10 are arranged in an element arrangement surface 9b of a sheet-shaped body 9.

In the case where the visible light absorption element 10 in FIG. 8A is used to form an infrared ray visualization device 30, an infrared ray absorbing portion 13 may be connected (coupled) to the visible light absorption element 10, as illustrated in FIG. 8C. In other words, with the visible light absorption element 10 and the infrared ray absorbing portion 13 illustrated in FIG. 8C being one set, the infrared ray visualization device 30 has a configuration, as illustrated in FIG. 8D, in which a large number of the sets of the visible light absorption elements 10 and infrared ray absorbing portions 13 are arranged in an element arrangement surface 11a of an element supporting body 11.

The configurations illustrated in FIGS. 8A to 8D can be produced on the basis of, for example, the techniques described in NPL 1 and NPL 2.

Configuration Example 6

The visible light absorption element 10 may be configured with two L-shaped portions 14 arranged at an interval from each other (preferably in parallel), as illustrated in FIG. 9A. Each L-shaped portion 14 has an L-shaped cross section, as illustrated in FIG. 9A, and is made of metal. The two L-shaped portions 14 arranged at an interval from each other constitute an inductor portion. Further, the two L-shaped portions 14 constitute a capacitor portion by a space 16 between these L-shaped portions 14. As the two L-shaped portions 14 are thermally deformed (for example, curved), the spacing therebetween changes, causing the capacitance of the capacitor portion to change.

In the case where the visible light absorption element 10 in FIG. 9A is used to form a temperature visualization device 20, the temperature visualization device 20 has a configuration, as illustrated in FIG. 9B, in which a large number of the visible light absorption elements 10 are arranged in an element arrangement surface 9b of a sheet-shaped body 9.

In the case where the visible light absorption element 10 in FIG. 9A is used to form an infrared ray visualization device 30, an infrared ray absorbing portion 13 may be connected (coupled) to the visible light absorption element 10, as illustrated in FIG. 9C. In other words, with the visible light absorption element 10 and the infrared ray absorbing portion 13 illustrated in FIG. 9C being one set, the infrared ray visualization device 30 has a configuration, as illustrated in FIG. 9D, in which a large number of the sets of the visible light absorption elements 10 and infrared ray absorbing portions 13 are arranged in an element arrangement surface 11a of an element supporting body 11.

Configuration Example 7

The visible light absorption element 10 may be configured with two comb-shaped portions 18 arranged at an interval from each other (preferably in parallel), as illustrated in FIG. 10A. Each comb-shaped portion 18 includes a plurality of comb tooth portions 18a, as illustrated in FIG. 10A, and is made of metal. The comb tooth portions 18a of one comb-shaped portion 18 and the comb tooth portions 18a of the other comb-shaped portion 18 are arranged at intervals (i.e. spaces 22) from each other. The two comb-shaped portions 18 constitute an inductor portion. The spaces 22, 23 between the two comb-shaped portions 18 constitute a capacitor portion. The space 22 refers to a space in arrangement directions of the comb tooth portions 18a. The space 23 refers to a space between a root portion 18b of one comb-shaped portion 18 and tip ends of the comb tooth portions 18a of the other comb-shaped portion 18. As the two comb-shaped portions 18 are thermally deformed (for example, curved), the spacing (spaces 22, 23) therebetween changes, causing the capacitance of the capacitor portion to change.

In the case where the visible light absorption element 10 in FIG. 10A is used to form a temperature visualization device 20, the temperature visualization device 20 has a configuration, as illustrated in FIG. 10B, in which a large number of the visible light absorption elements 10 are arranged in an element arrangement surface 9b of a sheet-shaped body 9.

In the case where the visible light absorption element 10 in FIG. 10A is used to form an infrared ray visualization device 30, an infrared ray absorbing portion 13 may be connected (coupled) to the visible light absorption element 10, as illustrated in FIG. 10C. In other words, with the visible light absorption element 10 and the infrared ray absorbing portion 13 illustrated in FIG. 10C being one set, the infrared ray visualization device 30 has a configuration, as illustrated in FIG. 10D, in which a large number of the sets of the visible light absorption elements 10 and infrared ray absorbing portions 13 are arranged in an element arrangement surface 11a of an element supporting body 11.

Configuration Example 8

The visible light absorption element 10 may be configured with a helical-shaped portion 25, as illustrated in FIG. 11A.

The helical-shaped portion 25 is made of metal. The helical-shaped portion 25 constitutes an inductor portion. Further, the helical-shaped portion 25 constitutes a capacitor portion by each helical interval between the adjacent turning portions of the helical-shaped portion 25, as indicated by the symbols of capacitors illustrated in FIG. 11B. As the helical-shaped portion 25 expands or contracts with thermal deformation, the capacitance of the capacitor portion changes.

In the case where the visible light absorption element 10 in FIG. 11A is used to form a temperature visualization device 20, the temperature visualization device 20 has a configuration, as illustrated in FIG. 11C, in which a large number of the visible light absorption elements 10 are arranged in an element arrangement surface 9b of a sheet-shaped body 9.

In the case where the visible light absorption element 10 in FIG. 11A is used to form an infrared ray visualization device 30, an infrared ray absorbing portion 13 may be connected (coupled) to the visible light absorption element 10, as illustrated in FIG. 11D. In other words, with the visible light absorption element 10 and the infrared ray absorbing portion 13 illustrated in FIG. 11D being one set, the infrared ray visualization device 30 has a configuration, as illustrated in FIG. 11E, in which a large number of the sets of the visible light absorption elements 10 and infrared ray absorbing portions 13 are arranged in an element arrangement surface 11a of an element supporting body 11.

Configuration Examples 5 to 8 described above can also be produced using photolithography, electron-beam lithography, etching technique, etc.

As described above, the visible light absorption element according to the present invention may adopt various configurations. In a preferable example, the resonance frequency of the visible light absorption element changes due to at least the capacitor portion of the visible light absorption element, because of its configurations and functions as follows. Specifically, the capacitor portion is formed by spacing between a plurality of constituent parts of the visible light absorption element. Here, a plurality of the constituent parts are the arm portions 7b in FIGS. 1 and 7A to 7F, the two flat-plate-shaped portions 8 in FIGS. 8A to 8D, the two L-shaped portions 14 in FIGS. 9A to 9D, the two comb-shaped portions 18 in FIGS. 10A to 10D, and parts of the helical-shaped portion 25 spaced apart from each other in the axial direction of the helical-shaped portion 25 in FIGS. 11A to 11E. As these constituent parts undergo thermal deformation such as thermal expansion, the spacing (space) between the constituent parts changes, causing the capacitance of the capacitor portion to change. This results in change of the resonance frequency of the visible light absorption element.

(Modification 2)

The infrared ray absorbing portion provided in the infrared ray visualization device 30 according to the present embodiment described above is not limited to the above-described configurations.

For example, an infrared ray absorbing portion may be configured with a substance that absorbs infrared rays, and two plate-like dielectrics sandwiching the substance. The substance that absorbs infrared rays may be an organic compound such as organic dye, carbon (graphite, carbon nanotube, graphene), an inorganic compound, or fine powder of metal.

As another option, an infrared ray absorbing portion may include two metal structural portions which are arranged to be shifted from each other by a quarter of wavelength in terms of a phase of infrared rays in the direction in which the infrared rays are made incident on the infrared ray visualization device 30. In this case, as the two metal structural portions are shifted from each other by a quarter of wavelength in terms of the phase of infrared rays, the infrared rays reflected from one metal structural portion and the infrared rays reflected from the other metal structural portion cancel each other so that the infrared rays are absorbed by the infrared ray absorbing portion.

In another example, an infrared ray absorbing portion may be formed on a surface of a visible light absorption element 10 by applying a paint of a material absorbing infrared rays directly to the visible light absorption element 10. In other words, the infrared ray absorbing portion may be the infrared ray absorbing material applied to the surface of the visible light absorption element 10. The material may be applied, for example, by spin coating, vacuum evaporation, or dip coating.

Each infrared ray absorbing portion may absorb infrared rays in a wide frequency range, or absorb infrared rays in a narrow frequency range or of a specific frequency. In the case where each infrared ray absorbing portion absorbs infrared rays in a narrow frequency range or of a specific frequency, a large number of infrared ray absorbing portions corresponding respectively to a large number of the visible light absorption elements may absorb infrared rays in the same narrow frequency range or of the same frequency, or may absorb infrared rays in narrow frequency ranges different from each other or of frequencies different from each other.

(Modification 3)

It is assumed in the above description that the thermal deformation of the visible light absorption element 10 is reversible. For example, in the case where the visible light absorption element 10 is thermally deformed within a range smaller than a predetermined limit, the visible light absorption element 10 returns to its original shape when the element 10 is returned to the original temperature. In other words, the visible light absorption element 10 is thermally deformed in a reversible manner.

According to the present invention, however, the above-described thermal deformation of the visible light absorption element 10 may be irreversible. For example, when the visible light absorption element 10 is plastically deformed by causing the element 10 to undergo thermal deformation exceeding the predetermined limit, the visible light absorption element 10 will not return to its original shape even if the element 10 is returned to the original temperature. In other words, the visible light absorption element 10 is thermally deformed in an irreversible manner.

REFERENCE SIGNS LIST

3a: first layer; 3b: second layer; 5, 6: space; 7: ribbon-shaped portion; 7a: central portion; 7b: arm portion; 8: flat-plate-shaped portion; 9: sheet-shaped body; 9a: attachment surface; 9b: element arrangement surface; 10: visible light absorption element; 11: element supporting body; 11a: element arrangement surface; 11b: opposite surface; 12: space; 13: infrared ray absorbing portion; 13a: first metal layer; 13b: second metal layer; 13c: dielectric layer; 14: L-shaped portion; 16: space; 18: comb-shaped portion; 18a: comb tooth portion; 18b: root portion; 20: temperature visualization device; 22, 23: space; 25: helical-shaped portion; and 30: infrared ray visualization device

The invention claimed is:

1. A visible light absorption element that, in accordance with heat received from a target object, changes a frequency component of visible light to reflect or transmit,
   wherein the visible light absorption element possesses a resonance frequency included in a visible light frequency region, and resonates and absorbs visible light when the visible light of the resonance frequency enters on the element,
   the visible light absorption element thermally deforms due to temperature change to thereby change the resonance frequency, and absorbs visible light of the changed resonance frequency,
   the visible light absorption element includes two arm portions, wherein the two arm portions each include a base end and a distal end, and each of the arm portions extend from the respective base end to the distal end in a circumferential direction to form a ring shape,
   each of the two arm portions protrudes from its respective base end into a space area so that an entirety of each of the two arm portions excluding the base end stays in the space area,
   the distal ends of the two arm portions are spaced apart from each other in the circumferential direction, and
   the visible light absorption element is formed of a material including a conductive material, and when visible light of the resonance frequency enters on the visible light absorption element, the visible light absorption element resonates with the visible light so that an electric current flows in the circumferential direction in the visible light absorption element.

2. The visible light absorption element according to claim 1, wherein the visible light absorption element includes first and second layers superimposed to each other in a radial direction of the ring shape,
   at least one of the first and second layers is formed of the conductive material, and
   the first and second layers have different thermal expansion coefficients.

3. The visible light absorption element according to claim 1, wherein the visible light absorption element has inductance depending on a dimension of the ring shape, and has capacitance depending on the space in the circumferential direction, and an LC circuit possessing the resonance frequency is configured by the inductance and the capacitance.

4. A visible light absorption element that, in accordance with heat received from a target object, changes a frequency component of visible light to reflect or transmit,
   wherein the visible light absorption element possesses a resonance frequency included in a visible light frequency region, and resonates and absorbs visible light when the visible light of the resonance frequency enters on the element,
   wherein the visible light absorption element thermally deforms due to temperature change to thereby change the resonance frequency, and absorbs visible light of the changed resonance frequency,
   wherein the visible light absorption element comprises:
   an inductor portion functioning as a coil having inductance; and
   a capacitor portion functioning as a capacitor having capacitance,
   wherein the inductor portion and the capacitor portion constitutes an LC circuit,
   the LC circuit possesses the resonance frequency, and
   thermal deformation of one or both of the inductor portion and the capacitor portion causes the resonance frequency to be changed, and
   wherein the visible light absorption element comprises flat-plate-shaped portions arranged at an interval therebetween, the interval forms the capacitor portion, and each of the flat-plate-shaped portions forms the inductor portion and includes a base end extending in a direction perpendicular to a thickness direction of the flat-plate-shaped portion, and protrudes from the base end into a space area so that entirety of each of the flat-plate-shaped portions excluding the base end remains in the space area, or
   the visible light absorption element comprises two L-shaped portions arranged at an interval therebetween and having an L-shaped section, the interval forms the capacitor portion, and each of the L-shaped portions forms the inductor portion, includes a base end, and extends from the base end to form the L-shaped section, and protrudes from the base end into a space area in such a way that entirety of each of the L-shaped portions excluding the base end stays in the space area, or
   the visible light absorption element comprises two comb-shaped portions arranged at an interval therebetween, between a plurality of tooth portions in one of the comb-shaped portions, a tooth portion in the other of the comb-shaped portions is positioned, the interval forms the capacitor portion, and each of the comb-shaped portions forms the inductor portion, includes a base end, and extends from the base end to the tooth portion, and protrudes from the base end into a space area so that an entirety of each of the comb-shaped portions excluding the base end stays in the space area, or
   the visible light absorption element comprises a helical-shaped portion, the helical-shaped portion forms the inductor portion, a helical interval of the helical-shaped portion forms the capacitor portion, and the helical-shaped portion includes a base end, and helically protrudes from the base end into a space area so that an entirety of the helical-shaped portion excluding the base end stays in the space area.

5. An infrared ray visualization device comprising:
   a visible light absorption element that, in accordance with heat received from a target object, changes a frequency component of visible light to reflect or transmit;
   an element supporting body in which a large number of the visible light absorption elements are integrated; and
   at least one infrared ray absorbing portion thermally connected to the respective visible light absorption elements,
   wherein the visible light absorption element possesses a resonance frequency included in a visible light frequency region, and resonates and absorbs visible light when the visible light of the resonance frequency enters on the element,
   the visible light absorption element includes two arm portions, wherein the two arm portions each include a base end and a distal end, and each arm portion extends from the base end to the distal end in a circumferential direction to form a ring shape,
   each of the two arm portions protrudes from the base end into a space area so that the entirety of each of the two arm portions excluding the base end stays in the space area, the distal ends of the two arm portions are spaced apart from each other in the circumferential direction, and the visible light absorption element thermally deforms due to temperature change to thereby change the resonance frequency, and absorbs visible light of the changed resonance frequency.

6. The infrared ray visualization device according to claim 5, wherein a large number of the visible light absorption elements are integrally connected to the one infrared ray absorbing portion or a large number of the infrared ray absorbing portions.

7. An infrared ray visualization device comprising:

a visible light absorption element that, in accordance with heat received from a target object, changes a frequency component of visible light to reflect or transmit;

an element supporting body in which a large number of the visible light absorption elements are integrated; and at least one infrared ray absorbing portion thermally connected to the respective visible light absorption elements, wherein the visible light absorption element possesses a resonance frequency included in a visible light frequency region, and resonates and absorbs visible light when the visible light of the resonance frequency enters on the element, the visible light absorption element thermally deforms due to temperature change to thereby change the resonance frequency, and absorbs visible light of the changed resonance frequency wherein the visible light absorption element comprises:

an inductor portion functioning as a coil having inductance; and a capacitor portion functioning as a capacitor having capacitance, wherein the inductor portion and the capacitor portion constitutes an LC circuit, the LC circuit possesses the resonance frequency, and thermal deformation of one or both of the inductor portion and the capacitor portion causes the resonance frequency to be changed, and wherein the visible light absorption element comprises two flat-plate-shaped portions arranged at an interval therebetween, the interval forms the capacitor portion, and each of the flat-plate-shaped portions forms the inductor portion, includes a base end in a direction perpendicular to a thickness direction of the flat-plate-shaped portion, and protrudes from the base end into a space area so that entirety of each of the flat-plate-shaped portions excluding the base end stays in the space area, or the visible light absorption element comprises two L-shaped portions arranged at an interval therebetween and having an L-shaped section, the interval forms the capacitor portion, and each of the L-shaped portions forms the inductor portion, includes a base end, and extends from the base end and is halfway bent so as to form the L-shaped section, and protrudes from the base end into a space area so that entirety of each of the L-shaped portions excluding the base end stays in the space area, or the visible light absorption element comprises two comb-shaped portions arranged at an interval therebetween, between a plurality of tooth portions in one of the comb-shaped portions, a tooth portion in the other of the comb-shaped portions is positioned, the interval forms the capacitor portion, and each of the comb-shaped portions forms the inductor portion, includes a base end, extends from the base end to the tooth portion, and protrudes from the base end into a space area so that entirety of each of the comb-shaped portions excluding the base end stays in the space area, or the visible light absorption element comprises by a helical-shaped portion, the helical-shaped portion forms the inductor portion, a helical interval of the helical-shaped portion forms the capacitor portion, and the helical-shaped portion includes a base end, and helically protrudes from the base end into a space area so that entirety of the helical-shaped portion excluding the base end stays in the space area.

8. The infrared ray visualization device according to claim 7, wherein a large number of the visible light absorption elements are integrally connected to the one infrared ray absorbing portion or a large number of the infrared ray absorbing portions.

* * * * *